US012463262B2

(12) United States Patent
Kageyama et al.

(10) Patent No.: US 12,463,262 B2
(45) Date of Patent: Nov. 4, 2025

(54) ENERGY STORAGE SYSTEM

(71) Applicant: Panasonic Intellectual Property Management Co., Ltd., Osaka (JP)

(72) Inventors: Youichi Kageyama, Osaka (JP);
Takashi Higashide, Osaka (JP);
Katsunori Atago, Fukushima (JP);
Kazuo Takenaka, Osaka (JP); Hisao Hiragi, Osaka (JP); Yugo Setsu, Osaka (JP); Hiroki Nishinaka, Osaka (JP);
Tsukasa Onodera, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 657 days.

(21) Appl. No.: 17/442,556

(22) PCT Filed: May 21, 2020

(86) PCT No.: PCT/JP2020/020069
§ 371 (c)(1),
(2) Date: Sep. 23, 2021

(87) PCT Pub. No.: WO2020/241439
PCT Pub. Date: Dec. 3, 2020

(65) Prior Publication Data
US 2022/0166074 A1    May 26, 2022

(30) Foreign Application Priority Data
May 31, 2019 (JP) .................... 2019-101917

(51) Int. Cl.
*H01M 10/42* (2006.01)
*H01M 10/44* (2006.01)
*H01M 10/48* (2006.01)

(52) U.S. Cl.
CPC ....... *H01M 10/4264* (2013.01); *H01M 10/44* (2013.01); *H01M 10/48* (2013.01); *H01M 2010/4271* (2013.01)

(58) Field of Classification Search
CPC .............. H01M 10/4264; H01M 2010/4271
See application file for complete search history.

(56) References Cited

U.S. PATENT DOCUMENTS 9,329,239 B2 * 5/2016 Kunimitsu .............. B60L 58/15
2010/0283434 A1 * 11/2010 Kakiuchi .............. H02J 7/0014
320/166

(Continued)

FOREIGN PATENT DOCUMENTS

JP    2004-129439    4/2004
JP    2004-236474    8/2004

(Continued)

OTHER PUBLICATIONS

International Search Report of PCT application No. PCT/JP2020/020069 dated Jul. 14, 2020.

*Primary Examiner* — Julian D Huffman
*Assistant Examiner* — Sadia Kousar
(74) *Attorney, Agent, or Firm* — WHDA, LLP

(57) ABSTRACT

A power storage system includes a storage unit, a charging circuit configured to supply a charging current to the storage unit, and a controller connected to the storage unit. The storage unit includes plural capacitor elements connected in series to one another each having both ends, plural resistors connected to the capacitor elements, and plural switch elements connected to the capacitor elements and the resistors. One of both ends of each capacitor element of the plural capacitor elements is connected to one end of a corresponding resistor of the plural resistors. Another of the both ends (Continued)

of the each capacitor element is connected to one end of a corresponding switch element of the plural switch elements. Another end of the corresponding resistor is connected to another end of the corresponding switch element. The corresponding switch element is configured to selectively switch between a connected state in which the one end of the corresponding switch element is connected to the another end of the corresponding switch element and a disconnected state in which the one end of the corresponding switch element is disconnected from the another end of the corresponding switch element. While the charging circuit supplies the charging current to the storage unit, the controller is configure to perform the following operation. The controller causes the corresponding switch element to be in the disconnected state when a difference between the storage voltage of the each capacitor element and the reference voltage is equal to or larger than a predetermined first voltage difference value. The reference voltage increases as the each capacitor element is charged. The controller causes the corresponding switch element to be in the connected state when the difference between the storage voltage of the each capacitor element and the reference voltage is larger than the predetermined first voltage difference value, and then, switches the corresponding switch element from the connected state to the disconnected state when the difference between the storage voltage of the each capacitor element and the reference voltage becomes smaller than a predetermined second voltage difference value.

10 Claims, 7 Drawing Sheets

(56) References Cited

U.S. PATENT DOCUMENTS

| 2015/0211212 A1* | 7/2015 | Takeo .................... E02F 9/2091 |
| | | 903/903 |
| 2016/0254683 A1 | 9/2016 | Matsumoto et al. |
| 2021/0242690 A1* | 8/2021 | Okamoto ........... H10D 30/6755 |

FOREIGN PATENT DOCUMENTS

| JP | 2009-071936 | 4/2009 |
| JP | 2015-080334 | 4/2015 |
| WO | 2014/122869 | 8/2014 |

* cited by examiner

United States Patent US 12,463,262 B2

ENERGY STORAGE SYSTEM

CROSS-REFERENCE TO RELATED APPLICATIONS

This application is a U.S. national stage application of the PCT international application No. PCT/JP2020/020069 filed on May 21, 2020, which claims the benefit of foreign priority of Japanese patent application No. 2019-101917 filed on May 31, 2019, the contents all of which are incorporated herein by reference.

TECHNICAL FIELD

The present invention relates to a power storage system to be used in various electronic equipment.

BACKGROUND ART

FIG. 7 is a circuit block diagram of conventional power storage device 1 disclosed in PTL 1. Power storage device 1 includes capacitor elements 2 connected in series to one another and charging circuit 3 for charging capacitor elements 2.

CITATION LIST

Patent Literature

PTL 1: Japanese Patent Laid-Open Publication No. 2004-236474

SUMMARY

A power storage system includes a storage unit, a charging circuit configured to supply a charging current to the storage unit, and a controller connected to the storage unit. The storage unit includes plural capacitor elements connected in series to one another each having both ends, plural resistors connected to the capacitor elements, and plural switch elements connected to the capacitor elements and the resistors. One of both ends of each capacitor element of the plural capacitor elements is connected to one end of a corresponding resistor of the plural resistors. Another of the both ends of the each capacitor element is connected to one end of a corresponding switch element of the plural switch elements. Another end of the corresponding resistor is connected to another end of the corresponding switch element. The corresponding switch element is configured to selectively switch between a connected state in which the one end of the corresponding switch element is connected to the another end of the corresponding switch element and a disconnected state in which the one end of the corresponding switch element is disconnected from the another end of the corresponding switch element. While the charging circuit supplies the charging current to the storage unit, the controller is configure to perform the following operation. The controller causes the corresponding switch element to be in the disconnected state when a difference between the storage voltage of the each capacitor element and the reference voltage is equal to or larger than a predetermined first voltage difference value. The reference voltage increases as the each capacitor element is charged. The controller causes the corresponding switch element to be in the connected state when the difference between the storage voltage of the each capacitor element and the reference voltage is larger than the predetermined first voltage difference value, and then, switches the corresponding switch element from the connected state to the disconnected state when the difference between the storage voltage of the each capacitor element and the reference voltage becomes smaller than a predetermined second voltage difference value.

This storage system has a small size.

DETAILED DESCRIPTION OF PREFERRED EMBODIMENT

Figure 1:
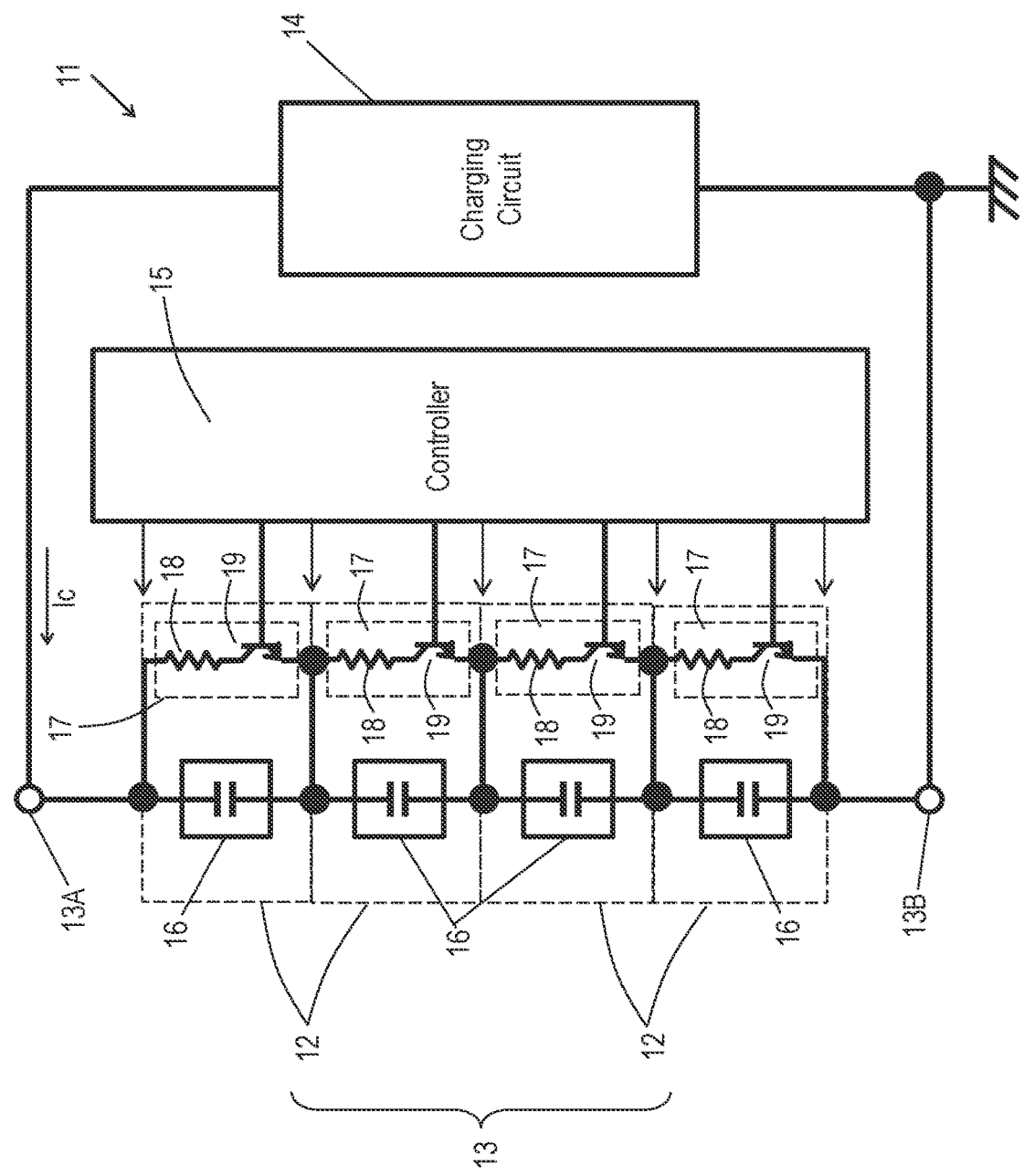
FIG. 1 is a circuit block diagram of a power storage system in accordance with an exemplary embodiment.

FIG. 1 is a circuit block diagram of power storage system 11 in accordance with an exemplary embodiment. Power storage system 11 includes storage unit 13 including storage elements 12 connected in series to one another, charging circuit 14 configured to supply and stop supplying a charging current to storage unit 13, and controller 15 connected to storage elements 12.

Charging circuit 14 supplies a direct-current (DC) voltage across both ends 13A and 13B of storage unit 13. Each storage element 12 includes capacitor element 16 and voltage adjustment circuit 17 connected in parallel to capacitor element 16. Voltage adjustment circuit 17 includes a series assembly including resistor 18 and switch element 19 which are connected in series to each other.

Controller 15 detects a storage voltage across both ends of capacitor element 16 of each of individual storage elements 12. Controller 15 compares storage voltages of all storage elements 12 with a reference voltage that increases as the charging of the capacitor element proceeds. Controller 15 is obtains a difference between the reference voltage and the storage voltage of each of individual storage elements 12. Controller 15 switches switch element 19 of storage element 12 from a disconnected state as an initial state to a connected state when the difference between the reference voltage and the storage voltage is larger than a predetermined voltage difference value Vz1. After that, controller 15 switches switch element 19 from the connected state to the disconnected state when the difference between the reference voltage and the storage voltage of voltage storage element 12 with switch element 19 in the connected state becomes smaller than a predetermined voltage difference value Vz2.

In the above configuration, when a storage voltage of a particular storage element 12 out of storage elements 12 increases more extraordinarily than storage voltages of the other storage elements 12 and the difference between the storage voltage and the reference voltage becomes larger, the controller causes switch element 19 of the particular storage element 12 with the increased storage voltage to be in the connected state so as to discharge an electric charge of capacitor element 16 to resistor 18. Alternatively, the controller causes switch element 19 of the particular storage element 12 in the connected state so as to divert a charging current flowing from charging circuit 14 to storage element 12 into the series assembly of resistor 18 and switch element 19.

This operation suppresses a charging current flowing to storage element 12 with a storage voltage largely increasing by charging as compared with the reference voltage. Consequently, the increase of the storage voltage is temporarily slowed down. Alternatively, the storage voltage does not increase temporarily. Then, charging can be continued by the supply of an electric current before charging current is suppressed again if necessary. Thus, storage element 12 is charged with an appropriate voltage that does not excessively increase.

Therefore, it is not necessary to set an excessive margin between a rated voltage and a storage voltage in capacitor element 16. As a result, a desired voltage can be charged to storage unit 13 with an appropriate number of storage elements 12 without increasing the number of storage elements 12 connected in series while suppressing deterioration of storage element 12, thus allowing power storage system 11 to have a small size.

Figure 7:
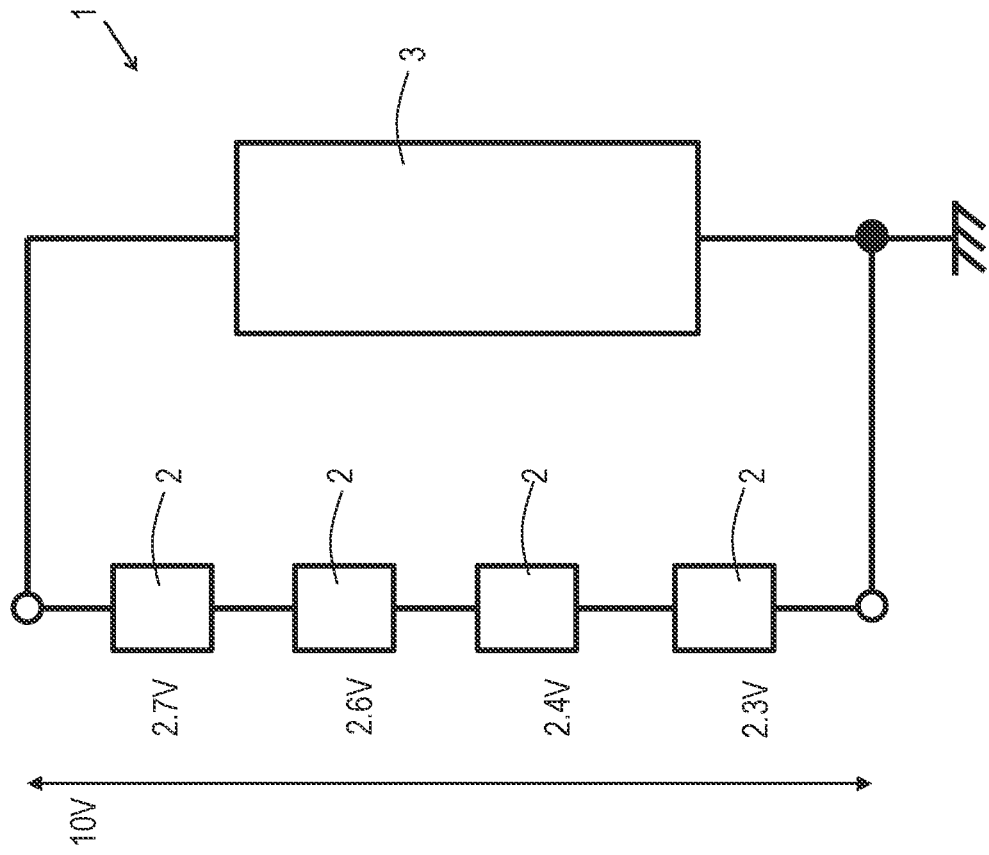
FIG. 7 is a circuit block diagram of a conventional power storage device.

In a conventional power storage device 1 shown in FIG. 7, when charging circuit 3 charges capacitor elements 2 to have a voltage of, e.g. 10 V, capacitor elements 2 with characteristics completely coincide with one another is charged to 2.5 V. In general, since internal resistance values of individual capacitor elements 2 are different from one another, voltages with which the individual capacitor elements 2 are charged become different from one another. If the rated voltage of individual capacitor elements 2 is 2.5 V, one or some capacitor elements 2 may be charged to, for example, 2.7 V, which his higher than the rated voltage due to the difference of the individual internal resistance values. Then, upon being charged with a voltage higher than the rated voltage repetitively, capacitor element 2 charged to a voltage higher than the rated voltage is deteriorated earlier than the other capacitor elements 2, and storage performance of an entire power storage device 1 may thus be deteriorated faster.

Consequently, in the conventional power storage device 1, a voltage at the both ends of capacitor elements 2 serially connected is maintained, and a storage voltage of each of individual capacitor elements 2 is lower than the rated voltage of capacitor element 2. Then, the number of thin capacitor elements 2 is increased. This configuration may suppresses deterioration of the storage performance of individual capacitor elements 2 and storage performance of the entire power storage device 1.

However, as a result, the storage voltage of each of the individual capacitor elements 2 decreases. Consequently, the number of capacitor elements 2 connected in series is increased in order to obtain a predetermined voltage, thus increases the size of power storage device 1.

On the contrary, as described above, power storage system 11 in accordance with the embodiment has a small size.

Figure 2:
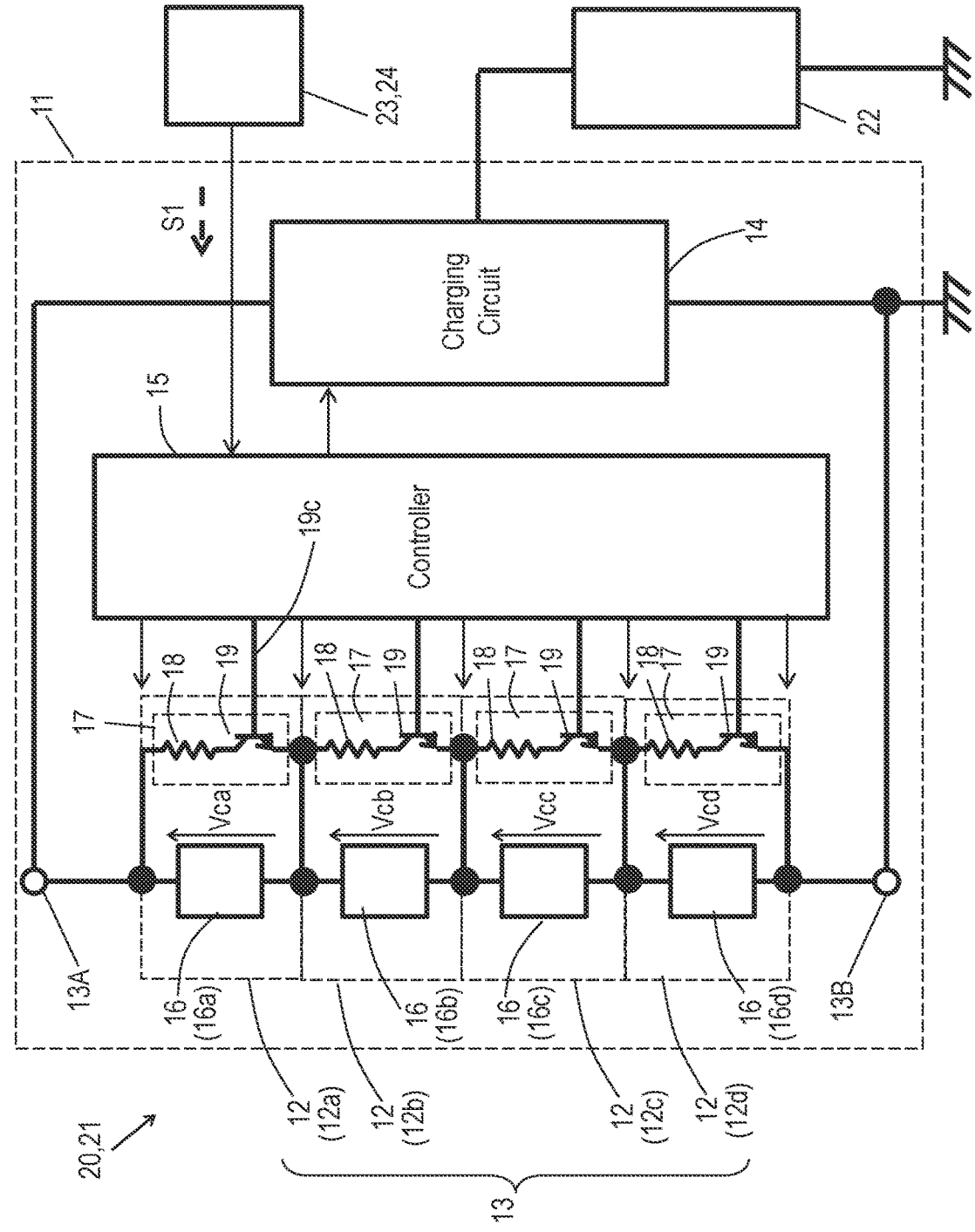
FIG. 2 is a circuit block diagram of a vehicle including the power storage system in accordance with the embodiment installed thereto.

FIG. 2 is a circuit block diagram of vehicle 20 including power storage system 11 installed thereto. Power storage system 11 is installed in vehicle body 21 of vehicle 20.

Charging circuit 14 is provided in an electric power supply path from vehicle storage battery 22 to storage unit 13. In other words, charging circuit 14 is provided in a charging path from vehicle storage battery 22 to storage unit 13 for charging storage unit 13.

Switch element 19 may preferably be implemented by a semiconductor switch made of a bipolar transistor or a monopolar transistor, such as a field effect transistor (FET).

Capacitor element 16 may be preferably implemented by, for example, an electric double-layer capacitor and a lithium ion capacitor. These capacitors have a low internal resistance, and can output a large electric current for a short time, so that power storage system 11 can supply electric power for driving vehicle load 26 of various types.

Control terminal 19c of switch element 19 is connected to controller 15. Controller 15 is activated by an activation signal S1 transmitted from vehicle starter switch 23 provided to vehicle body 21 of the vehicle 20. Vehicle starter switch 23 may be a switch linked to the start of vehicle 20. The activation signal S1 is transmitted from signal generator 24 when an occupant of vehicle 20 operates vehicle starter switch 23.

Power storage system 11 includes storage unit 13, charging circuit 14 configured to supply a charging current to storage unit 13, and controller 15 connected to storage unit 13. Storage unit 13 includes capacitor elements 16 (16a-16d) connected in series to one another and each having both ends, resistors 18 connected to capacitor elements 16 (16a-16d), and switch elements 19 connected to capacitor elements 16 (16a-16d) and resistors 18. One of the both ends of each capacitor element 16 (16a-6d) of capacitor elements 16 (16a-6d) is connected to one end of corresponding resistor 18 of resistors 18. Another of the both ends of each capacitor element 16 (16a-16d) is connected to one end of a corresponding switch element 19 of switch elements 19. Another end of the corresponding resistor 18 is connected to another end of the corresponding switch element 19. The corresponding switch element 19 is configured to selectively switch between a connected state in which one end of the corresponding switch element 19 is connected to another end of the corresponding switch element 19 and a disconnected state in which one end of the corresponding switch element 19 is disconnected from another end of the corresponding switch element 19.

Firstly, as a first step, the following control and operations are performed. Controller 15 is activated by receiving an activation signal S1 transmitted from vehicle starter switch 23 provided in vehicle body 21. Vehicle starter switch 23 may be a switch linked to activation of vehicle 20. Activation signal S1 is transmitted when an occupant of vehicle 20 operates vehicle starter switch 23.

Controller 15 detects a storage voltage across both ends of capacitor element 16 of each of storage elements 12. Controller 15 may further detect a potential difference between ends 13A and 13B of storage unit 13.

Controller 15 detects a storage voltage across both ends of each capacitor element 16 upon receiving the activation signal S1. Before vehicle 20 is started, a voltage stored in storage elements 12 of storage unit 13 and storage element 12 is an initial voltage that is not higher than a predetermined voltage suppressing deterioration of capacitor elements 16. In other words, when vehicle 20 is not started, capacitor element 16 is charged with a low voltage. When controller 15 receives activation signal S1, controller 15 activates charging circuit 14 to cause charging circuit 14 to supply electric power to storage elements 12.

One of the timing of the activation of charging circuit 14 and the timing of the detection of a voltage by storage element 12 may be earlier than the other, or both the timing may be the same. Since controller 15 normally operates charging circuit 14 in response to the storage voltage of storage element 12, the detection of the voltage by storage element 12 may be preferably performed earlier than the activation of charging circuit 14.

At this moment, switch element 19 of storage element 12 is initially in the disconnected state as an initial state. An initial voltage Vint of capacitor element 16 is set to a low voltage of about 20% or 30% of the full storage voltage or the rated voltage. This low voltage less likely deteriorates the capacitor element even when the device is left for a long time as described above.

The above is the first step, and then, the following control and operations are performed as a second step. In the second step, storage element 12 is charged. Controller 15 operates charging circuit 14 to cause charging circuit 14 to supply electric power to each of storage elements 12. Around the time point at which controller 15 starts to operate charging circuit 14, switch elements 19 of all storage elements 12 continuously are in the disconnected state that is an initial state as described above. All of the charging currents flowing in storage element 12 flow into all of capacitor elements 16. In other words, at this moment, no electric currents flows into each of voltage adjustment circuits 17 connected in parallel to respective one of capacitor elements 16.

Figure 3:
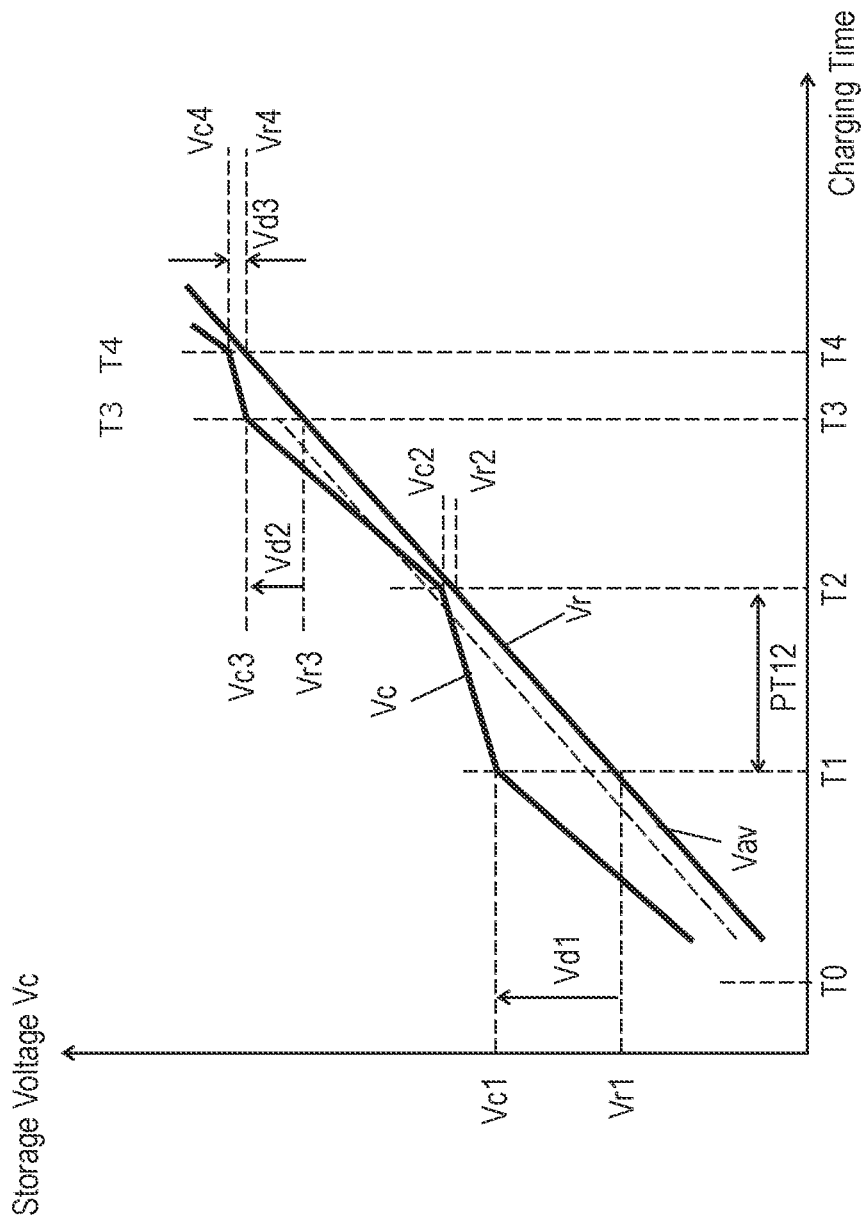
FIG. 3 shows a storage voltage and a charging time of the power storage system in accordance with the embodiment.

FIG. 3 shows storage voltage Vc of storage element 12 of power storage system 11 with respect to the charging time in accordance with the embodiment. When electric power is supplied to each storage element 12, storage voltage Vc that is a voltage on the both ends of each storage element 12, that is, a voltage across both ends 161 and 162 of capacitor element 16 increases as the lapse of time. Each of storage elements 12 connected in series to one another includes respective one of capacitor elements 16 having substantially the same characteristics, respective one of resistors 18 having substantially the same characteristics, and respective one of switch elements 19 having substantially the same characteristics.

Storage voltage Vc shown in FIG. 3 is a voltage across the both ends of any one of storage elements 12. For example, storage voltage Vc is storage voltage Vca across the both ends of storage element 12a out of four storage elements 12a-12d shown in FIG. 2. In other words, a curve of storage voltage Vc denotes storage voltage Vca across the both ends of capacitor element 16a out of capacitor elements 16a-16d.

Storage voltage Vc increases as the charging time increases. Storage voltage Vc is always detected by controller 15 when the charging is performed. Alternately, storage voltage Vc may be intermittently detected by controller 15 at every predetermined time while the charging is performed. FIG. 3 shows storage voltage Vc of storage element 12a, but storage voltage Vcb across the both ends of storage element 12b (capacitor element 16b), storage voltage Vcc across the both ends of storage element 12c (capacitor element 16c), and storage voltage Vcd across the both ends of storage element 12d (capacitor element 16d) change similar to storage voltage Vca (Vc) shown in FIG. 3.

Storage voltages Vca-Vcd across the both ends of storage elements 12a-12d (capacitor elements 16a-16d) are detected simultaneously. Alternatively, storage voltages Vca-Vcd of storage elements 12a-2d may be detected at timings different from one another. For example, controller 15 may detect storage voltage Vca of storage element 12a, then, detect storage voltage Vcb of storage element 12b, then, detect storage voltage Vcc of storage element 12c, and then, detect storage voltage Vcd of storage element 12d. After that, load of operation of controller 15 is reduced by repetitively detecting storage voltages Vca-Vcd across both ends of each of storage elements 12a-12d (capacitor elements 16a-16d) sequentially similarly to the detection of storage voltage Vca of storage element 12a.

Controller 15 compares, for example, storage voltage Vc (Vca) of storage element 12a with reference voltage Vr. Reference voltage Vr increases as the charging time of the storage unit 13, i.e., storage elements 12a-12d (capacitor elements 16a-16d) increases. Reference voltage Vr is preferably set after it is previously recorded in controller 15 based on typical characteristics of capacitor element 16. Reference voltage Vr may be based on the lowest value of the increase rates of the storage voltages of capacitor elements 16 each charged with a constant current.

Specifically, reference voltage Vr may be a storage voltage of capacitor element 16 with a storage voltage least increasing within allowable characteristic values of capacitor elements 16. For example, charging circuit 14 supplies electric power to storage unit 13 by supplying a constant current of charging current Ic to charge capacitor element 16 of storage element 12. In this case, the reference voltage corresponding to the smallest increase rate of storage voltage per unit time. Average value Vav of the increase rates of storage voltage Vc of capacitor elements 16 of storage unit 13 is shown in FIG. 3.

Consequently, the increase rate of storage voltage Vc is larger than that of reference voltage Vr. As the charging time increases, the difference Vd (=Vc−Vr) between storage voltage Vc and reference voltage Vr which is obtained by subtracting reference voltage Vr from storage voltage Vc increases as the passage of charging time. When controller 15 detects that difference Vd1 (=Vc1−Vr1) between value Vc1 of storage voltage Vc at timing T1 and value Vr1 of reference voltage Vr is larger than voltage difference value Vz1, controller 15 switches switch element 19 of voltage adjustment circuit 17 of storage element 12a from the disconnected state as the initial state to the connected state.

In other words, controller 15 transmits a signal for switching switch element 19 into the connected state to control terminal 19c of switch element 19 of storage element 12a in which difference Vd1 between value Vc1 of storage voltage Vc and value Vr1 of reference voltage Vr larger than voltage difference value Vz1. Alternatively, controller 15 stops transmitting of a signal for maintaining the disconnected state to control terminal 19c of switch element 19 in storage element 12a.

During period PT12 from timing T1 to timing T2 at which switch element 19 is disconnected again, capacitor element 16 of storage element 12a is connected I parallel to resistor 18. During period PT12, a charging current is divided into resistor 18, and a charging current flowing into capacitor element 16 is reduced. Alternatively, he charging of capacitor element 16 of storage element 12a by charging circuit 14 may be performed simultaneously to the discharging of capacitor element 16 of storage element 12a to resistor 18.

Consequently, in period PT12, storage voltage Vc of storage element 12a in which switch element 19 is in the connected state less likely increases. In other words, a value of resistor 18 of storage element 12a is determined such that the increase rate of storage voltage Vc is smaller than that of reference voltage Vr.

Then, when controller 15 detects, at timing T2, that the difference Vd (=Vc−Vr) between storage voltage Vc and reference voltage Vr obtained by subtracting reference voltage Vr from storage voltage Vc becomes smaller than voltage difference value Vz2, controller 15 switches switch element 19 of voltage adjustment circuit 17 of storage element 12a from the connected state to the disconnected state. The voltage difference value Vz2 may be a negative value.

In the case that voltage difference value Vz2 is a negative value, switch element 19 is switched from the connected state to the disconnected state when storage voltage Vc becomes lower than reference voltage Vr, and a difference Vd (=Vc−Vr) obtained by subtracting reference voltage Vr from storage voltage Vc becomes a negative value and becomes smaller than voltage difference value Vz2. In other words, voltage difference value Vz2 and the difference Vd obtained by subtracting reference voltage Vr from storage voltage Vc are both negative values, and the absolute value of difference Vd is not more than the absolute value of voltage difference value Vz2 before timing T2, and the absolute value of difference Vd is more than the absolute value of voltage difference value Vz2 at timing T2.

Controller 15 causes switch element 19 to be in the disconnected state at timing T2 at which difference Vd between storage voltage Vc and reference voltage Vr becomes smaller than voltage difference value Vz2. In FIG. 3, a value of storage voltage Vc at timing T2 is value Vc2, and a value of reference voltage Vr is value Vr2. Controller 15 stops transmission of a signal for maintaining the connected state of switch element 19 to control terminal 19c of switch element 19 of storage element 12a. Alternatively, controller 15 transmits a signal for causing switch element 19 to be in the disconnected state to control terminal 19c of switch element 19 of storage element 12a. Then, after timing T2, storage voltage Vc increases again at a higher increase rate than reference voltage Vr.

Then, after timing T2, when controller 15 detects again that difference Vd (=Vc3−Vr3) between value Vc3 of storage voltage Vc and value Vr3 of reference voltage Vr is larger than voltage difference value Vz3, controller 15 switches switch element 19 of voltage adjustment circuit 17 of storage element 12a from the disconnected state to the connected state. Then, when controller 15 detects, at timing T4, that difference Vd4 (=Vc4−Vr4) between value Vc4 of storage voltage Vc and value Vr4 of reference voltage Vr is smaller than voltage difference value Vz4, controller 15 switches switch element 19 of voltage adjustment circuit 17 of storage element 12a from the connected state to the disconnected state. The above operation is the second step causing storage voltage Vc to approximate to reference voltage Vr.

The above operation performs the charging while a voltage of particular storage element 12 out of storage elements 12 does not become a value extraordinarily different from voltages of the other storage elements 12, and voltages of all storage elements 12 have approximate values. Furthermore, reference voltage Vr is used as a value to be compared in which the charge speed of capacitor element 16 is slow. Consequently, storage voltage Vc less likely becomes an over-charged state. Alternatively, even if storage voltage Vc is in an over-charged state, the state is suppressed in an extremely short time.

Thus, the charging is performed without applying an excessive voltage to individual storage elements 12, so that charging is performed with an appropriate voltage for storage element 12. As a result, it is not necessary to prepare an excessive margin between the rated voltage and the storage voltage of capacitor element 16. Therefore, charge storage unit 13 with an appropriate number of storage elements 12 connected in series to one another may is charged without increasing the number of the capacitor elements while suppressing deterioration of storage elements 12. As a result, the size of power storage system 11 can be reduced.

As described above, the charging of storage element 12 is performed preferably while storage voltage Vc and reference voltage Vr have approximate values at all time. Therefore, voltage difference value Vz1 is preferably set at a small positive value. However, in order to stabilize operations of power storage system 11, voltage difference value Vz1 is preferably a value that is larger than voltage difference value Vz2. This configuration prevents the value of storage voltage Vc from being too far from reference voltage Vr, and allows capacitor element 16 of storage element 12 to be charged with storage voltage Vc and reference voltage Vr being within an appropriate range.

The voltage difference value Vz2 to be compared with difference Vd2 (=Vc2−Vr2) at timing T2 may be a negative value. In this case, voltage difference value Vz1 to be compared with difference Vd1 (=Vc1−Vr1) at timing T1 is preferably a small positive value. This configuration maintains storage voltage Vc and reference voltage Vr at approximate values, and allows power storage system 11 to operate stably.

The reference voltage Vr is a lower limit value within the range of characteristics of capacitor element 16. Reference voltage Vr may be set to, for example, the lowest value among storage elements 12.

Controller 15 detects voltages of all storage elements 12 at timing T0 before timing T1. Storage voltages Vc of all the storage elements 12 are detected preferably simultaneously to one another at timing T0. Controller 15 compares the storage voltages Vc of all storage elements 12 detected at timing T0 with reference voltage Vr. In the case that storage voltage Vca of storage element 12a is the lowest among storage voltages Vc of storage elements 12, reference voltage Vr is set to the value of storage voltage Vca of storage element 12a detected after timing T0.

A period during which reference voltage Vr is set to storage voltage Vca of storage element 12a is a period from timing T0 to the time when vehicle starter switch 23 is turned off and vehicle 20 stops as mentioned above. Then, at the timing T0 after vehicle 20 is activated again next time, reference voltage Vr may be set to the lowest value among storage voltages Vc of storage elements 12 which have been detected.

In this case, as mentioned above, initial voltages Vint of all capacitor elements 16 corresponding to storage voltages Vc of all storage elements 12 is preferably substantially identical to one another at the time when controller 15 receives activation signal S1, or the period from the time point when controller 15 receives activation signal S1 to timing T0. When controller 15 operates charging circuit 14 and voltage adjustment circuit 17 at the time point when controller 15 receives activation signal S1, initial voltages Vint of all of capacitor elements 16 may identical to one another. Alternatively, controller 15 operates a discharging circuit mentioned later and voltage adjustment circuit 17, thereby causing the initial voltages Vint of all of capacitor elements 16 to be identical to one another.

The above operation allows capacitor elements 16 to be charged while not causing storage voltage Vc of a particular storage element 12 to be extraordinarily different from storage voltage Vc of the other storage elements 12, and storage voltages Vc of all storage elements 12 become approximate values. Furthermore, storage voltage Vc, as reference voltage Vr, of capacitor element 16 in which the charging speed is the slowest is compared with the other storage voltage Vc of storage element 12. Consequently, storage voltage Vc hardly overcharges capacitor element 16. Alternatively, even if storage voltage Vc overcharges capacitor element 16, the overcharging is suppressed in an extremely short time, suppressing deterioration of capacitor element 16.

In particular, reference voltage Vr as a reference of comparison is set based on the value per se of storage voltage Vc of capacitor element 16 positioned in power storage system 11. Thus, it is not necessary to set an excessive margin with respect to reference voltage Vr in storage voltage Vc of capacitor element 16. As a result, storage unit 13 can be charged with an appropriate number without increasing the number of serially connected storage elements 12 while the deterioration of storage element 12 is suppressed. Thus, the size of power storage system 11 can be reduced.

Alternatively, reference voltage Vr may be set to an average value Vav of storage voltages Vc of all storage elements 12. Controller 15 obtains average value Vav of storage voltage Vc by calculation every time storage voltage Vc of storage element 12 is detected. In this case, reference voltage Vr changes precisely in response to the change of storage voltage Vc of individual storage elements 12.

This configuration thus allows storage voltages Vc of individual storage elements 12 to easily approximate reference voltage Vr, and decrease the period during which switch element 19 of voltage adjustment circuit 17 is in the connected state. As a result, an electric power loss which occurs in resistor 18 is suppressed.

In the second step described above, when controller 15 compares difference Vd between a value of storage voltage Vc and reference voltage Vr with the predetermined voltage difference value Vz, voltage difference value Vz may be reduced as reference voltage Vr increases. In other words, voltage difference value Vz1 to be compared with difference Vd1 at timing T1 is preferably larger than voltage difference value Vz3 to be compared with difference Vd3 at timing T3 in which the charging of storage element 12 proceeds and storage voltage Vc increases.

Even when storage voltage Vc of storage element 12 approaches a fully charged state, the particular storage element 12 less frequently reaches the full storage voltage, thus decreasing the period during which the full storage voltage is reached. As a result, storage unit 13 is charged while suppressing deterioration of storage element 12. Voltage difference values Vz1 and Vz3 may be identical to each other.

Controller 15 thus performs the following operations while charging circuit 14 supplies charging current Ic to the storage unit 15. Controller 15 compares storage voltage Vc across the both ends of capacitor element 16 with reference voltage Vr that increases as capacitor elements 16 are charged. When the difference Vd between storage voltage Vc of each capacitor element 16 and reference voltage Vr is not more than a predetermined first voltage difference value Vz1, controller 15 causes corresponding switch element 19 to be in the disconnected state. When the difference Vd between storage voltage Vc and reference voltage Vr of each capacitor element 16 is larger than a predetermined voltage difference value Vz1, controller 15 causes the corresponding switch element 19 to be in the connected state. After that, when the difference Vd between reference voltage Vr storage voltage Vc of each capacitor element 16 and is smaller than a predetermined voltage difference value Vz2, controller 15 switches the corresponding switch element 19 from the connected state to the disconnected state.

The predetermined voltage difference value Vz1 is larger than the predetermined voltage difference value Vz2.

The predetermined voltage difference value Vz1 may be smaller as reference voltage Vr increases.

Reference voltage Vr is determined in response to storage voltage Vc across the both ends of each of capacitor elements 16.

Reference voltage Vr may be the lowest value among storage voltages Vc across the both ends of capacitor elements 16.

Reference voltage Vr may be an average value Vav of storage voltages Vc between across both ends of capacitor elements 16.

Figure 4:
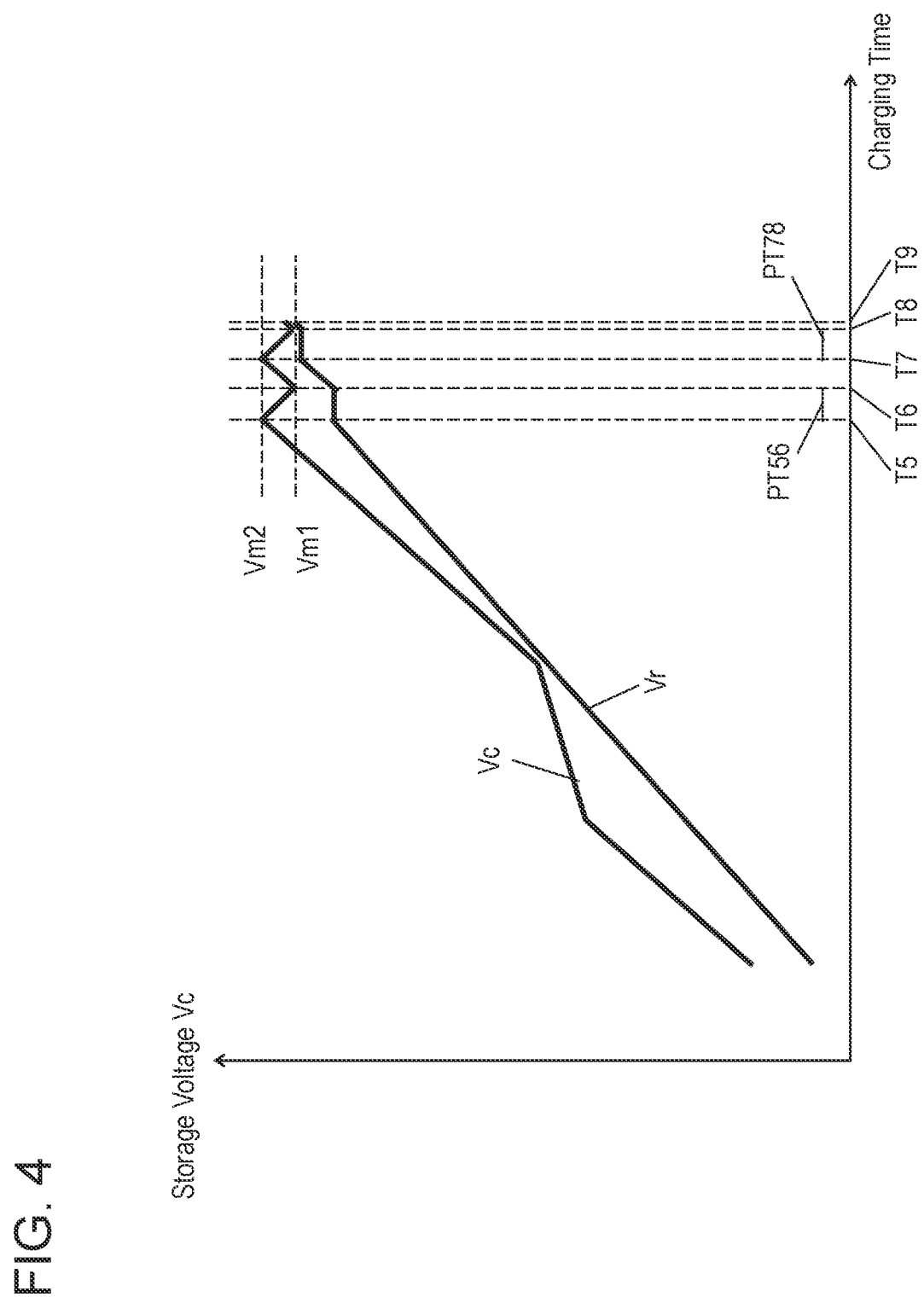
FIG. 4 shows a storage voltage and a charging time of the power storage system in accordance with the embodiment.

As a third step, an operation of power storage system 11 when storage element 12 approximately approaches the rated voltage of capacitor element 16 will be described below. The rated voltage may be a fully charged voltage of capacitor element 16. FIG. 4 show storage voltage Vc and the charging time in the operation of power storage system 11. In FIG. 4, items identical to those of FIG. 3 are denoted by the same reference numerals. In the third step, upper limit voltage Vm1 and upper limit voltage Vm2 are used as references for the operation. Upper limit voltage Vm2 is higher than upper limit voltage Vm1. Upper limit voltage Vm2 is set at the value that is substantially equal to or lower than the rated voltage.

Controller 15 causes charging circuit 14 to stop supplying charging current Ic to storage unit 13 when reference voltage Vr is higher than upper limit voltage Vm1. Alternatively, controller 15 may cause charging circuit 14 to stop supplying charging current Ic to storage unit 13 when reference voltage Vr reaches upper limit voltage Vm1. Thus, the charging is performed while storage voltages Vc of all storage elements 12 are lower than the rated voltage but are approximate to the rated voltage.

In FIG. 4, reference voltage Vr reaches upper limit voltage Vm1 at timing T9. In the case that a value previously set based on the typical characteristics of capacitor element 16 is used as reference voltage Vr, or that an average value Vav of all storage voltages Vc of storage elements 12 is used as reference voltage Vr, most of all storage elements 12 are charged with storage voltage Vc approximating to upper limit voltage Vm1.

In the case that a voltage of storage element 12 having the lowest voltage among storage elements 12 is used as reference voltage Vr, vultages of all storage elements 12 reach upper limit voltage Vm1 at timing T9. Consequently, the charging is performed to a charging state close to the specific limit of the capacitor element 16 while the deterioration of the characteristics of the capacitor element 16 is suppressed.

In the third step, power storage system 11 may operate in the following process to allow reference voltage Vr to reach upper limit voltage Vm1.

Controller 15 compares reference voltage Vr with upper limit voltage Vm1 while charging circuit 14 supplies charging current Ic to storage unit 13. Then, controller 15 compares storage voltage Vc of each storage element 12 with upper limit voltage Vm2 while charging circuit 14 supplies charging current Ic to storage unit 13. In other words, controller 15 performs determination necessary for the third step simultaneously to performing the second step.

When controller 15 detects, at timing T5, that storage voltage Vc of any one storage element 12 out of storage elements 12 is higher than upper limit voltage Vm2, controller 15 causes charging circuit 14 to stop supplying charging current Ic to storage unit 13. Alternatively, when controller 15 detects, at timing T5, that storage voltage Vc of any one storage element 12 out of storage elements 12 reaches upper limit voltage Vm2, controller 15 causes charging circuit 14 to stop supplying charging current Ic to storage unit 13. An operation when storage voltage Vca of capacitor element 16*a* of storage element 12*a* out of storage elements 12*a*-12*d* (12) shown in FIG. 3 is higher than upper limit voltage Vm2 or reaches upper limit voltage Vm2 will be described below.

When controller 15 detects, at timing T5, that storage voltage Vca of storage element 12*a* out of storage elements 12 is higher than upper limit voltage Vm2, controller 15 causes charging circuit 14 to stop supplying charging current Ic to storage unit 13 as described above. Alternatively, when controller 15 detects, at timing T5, that storage voltage Vca of storage element 12*a* out of storage elements 12 reaches upper limit voltage Vm2, controller 15 causes charging circuit 14 to stop supplying charging current Ic to storage unit 13 as described above. Furthermore, controller 15 switches switch elements 19 of storage element 12*a* from the disconnected state to the connected state, and maintains switch element 19 of the other storage elements 12*b*-12*d* at the disconnected state. At timing T5, as mentioned above, charging circuit 14 stops supplying electric power to storage unit 13. When switch element 19 becomes in the connected state at timing T5, capacitor element 16*a* is discharged to resistor 18, and storage voltage Vca of storage element 12*a* decreases regardless of the resistance of resistor 18, but storage voltage Vca of storage element 12*a* decreases at a lowering rate corresponding to the resistance of resistor 18.

After that, when storage voltage Vca of storage element 12*a* decreases and becomes lower than upper limit voltage Vm1 at timing T6, controller 15 switches switch element 19 of storage element 12*a* from the connected state to the disconnected state. Alternatively, when storage voltage Vca of storage element 12*a* decreases and reaches upper limit voltage Vm1 at timing T6, controller 15 switches switch element 19 of storage element 12*a* from the connected state to the disconnected state. During period PT56 from timing T5 to timing T6, capacitor elements 16*b*-16*d* of storage elements 12*b*-12*d* out of storage elements 12 other than storage element 12*a* are neither charged nor discharged. Therefore, during period PT56, reference voltage Vr is almost constant without changing. When reference voltage Vr is previously set to a value previously set based on the typical characteristics of capacitor element 16 is used for reference voltage Vr, or the lowest value of the storage voltages Vc of storage elements 12, reference voltage Vr dose not substantially change during period PT56.

The above operation prevents capacitor elements 16 of storage elements 12 from being charged to the rated voltage or the fully charged voltage or more, and causes storage voltages Vc of capacitor elements 16 of all storage elements 12 to approximate to one another and to be close to the fully charged state, thereby providing the capacitor elements with a charged state close to the full charged state. This suppresses procession of deterioration of capacitor elements 16.

At timing T6, controller 15 switches switch element 19 of storage element 12*a* from the connected state to the disconnected state, and causes charging circuit 14 to supply charging current Ic to storage unit 13. Thus, storage voltages Vc of all storage elements 12 including storage element 12*a* and reference voltage Vr start to increase again.

After that, similarly to the operation at timing T5, when controller 15 detects that storage voltage Vc of capacitor element 16 of any one storage element 12 out of storage elements 12 increases and becomes higher than upper limit voltage Vm2 at timing T7, controller 15 causes charging circuit 14 to stop supplying charging current Ic to storage unit 13. Alternatively, when controller 15 detects that storage voltage Vc of capacitor element 16 of any one storage element 12 out of storage elements 12 increases and reaches upper limit voltage Vm2 at timing T7, controller 15 cuts off the supply of charging current Ic from charging circuit 14 to storage unit 13. A storage element out of storage elements 12 which includes capacitor element 16 having storage voltage Vc that reaches upper limit voltage Vm2 earliest at timing T5 among capacitor elements 16 of storage elements 12 is generally identical to a storage element out of storage elements 12 which includes capacitor element 16 having storage voltage Vc that reaches upper limit voltage Vm2 earliest at timing T7 among capacitor elements 16 of storage elements 12. Therefore, where storage voltage Vc is an storage voltage Vca of storage element 12*a* shown in FIG. 3 also at timing T7, operations when storage voltage Vca of storage element 12*a* is higher than upper limit voltage Vm2 or reaches upper limit voltage Vm2 will be described below.

When controller 15 detects, at timing T7, that storage voltage Vca of storage element 12*a* out of storage elements 12 becomes higher than upper limit voltage Vm2, as described above, controller 15 causes charging circuit 14 to stop supplying charging current Ic to storage unit 13. Alternatively, when controller 15 detects, at timing T7, that storage voltage Vca of storage element 12*a* out of storage elements 12 reaches upper limit voltage Vm2, as described above, controller 15 causes charging circuit 14 to stop supplying charging current Ic to storage unit 13. Furthermore, similarly to timing T5, controller 15 switches switch element 19 of storage element 12*a* from the disconnected state to the connected state at timing T7, and maintains switch elements 19 of the other storage elements 12*b*-12*d* at the disconnected state. Similarly to timing T5, as mentioned above, charging circuit 14 does not supply electric power to storage unit 13 at timing T7. Therefore, when switch element 19 of storage element 12*a* becomes in the connected state at timing T7, capacitor element 16*a* is discharged to resistor 18, storage voltage Vca of capacitor element 16*a* of storage element 12*a* decreases regardless of the resistance of resistor 18, but storage voltage Vca of storage element 12*a* decreases at a lowering rate corresponding to the resistance of resistor 18.

After that, when storage voltage Vca of storage element 12*a* decreases and becomes lower than upper limit voltage Vm1 at timing T8, controller 15 switches switch element 19 of storage element 12*a* from the connected state to the disconnected state. Alternatively, when storage voltage Vca of storage element 12*a* decreases and reaches upper limit voltage Vm1 at timing T8, controller 15 switches switch element 19 of storage element 12*a* from the connected state to the disconnected state.

An operation of switch element 19 of storage element 12*a* and an operation of charging circuit 14 during period PT56 from timing T5 to timing T6 are the same as the operation of switch element 19 of storage element 12*a* and the operation of charging circuit 14 during period PT78 from timing T7 to timing T8. A value of reference voltage Vr at timing T8 is higher than that at timing T6. In other words, the value of reference voltage Vr at timing T8 is nearer to upper limit voltage Vm1 than that at timing T6.

When storage voltage Vca of capacitor element 16*a* of storage element 12*a* decreases and becomes lower than upper limit voltage Vm1 at timing T8, controller 15 switches switch element 19 of storage element 12*a* from the connected state to the disconnected state, and maintains switch elements 19 of the other storage elements 12*b*-12*d* at the disconnected state. Alternatively, when storage voltage Vca of capacitor element 16a of storage element 12a reaches upper limit voltage Vm1, controller 15 switches switch element 19 of storage element 12a from the connected state to the disconnected state, and maintains switch elements 19 of the other storage elements 12b-12d at the disconnected state. Furthermore, controller 15 causes charging circuit 14 to supply charging current Ic to storage unit 13. Thus, reference voltage Vr and storage voltages Vc (Vca-Vcd) of capacitor elements 16 (16a-16d) of all storage elements 12 (12a-12d) including storage element 12a start to increase again.

Then, reference voltage Vr increases and reaches upper limit voltage Vm1 at timing T9. In the case that reference voltage Vr is previously set based on the typical characteristics of capacitor element 16 or to an average value Vav of storage voltages Vc of all storage elements 12, capacitor elements 16 of most of all storage elements 12 are charged at timing T9 with storage voltage Vc having a value approximating upper limit voltage Vm1.

In the case that reference voltage Vr is set to the lowest value among storage voltages Vc of the capacitor elements 16 of storage elements 12, all storage elements 12 are charged to have upper limit voltage Vm1. Consequently, the charging is performed to a charging state close to the characteristic limit of the capacitor element while the deterioration of the characteristics of the capacitor element 16 is suppressed.

In the above description, the above-mentioned operation in which the connection of switch element 19 and the cutting-off of charging circuit 14 are performed twice repetitively during period PT56 from timing T5 to timing T6 and period PT78 from timing T7 to timing T8. The number of this operation depends on the set values of upper limit voltage Vm1 and upper limit voltage Vm2. Therefore, the operation of the connection of switch element 19 and cutting off of charging circuit 14 may be completed once in the period PT56, or may be repeated not only twice as mentioned above but also three or more times.

As described above, one of the both ends of a certain capacitor element 16a out of plural capacitor elements 16 (16a-6d) is connected to one end of a certain resistor 18 out of plural resistors 18. Another of the both ends of the certain capacitor element 16a is connected to one end of the certain switch element 19 out of plural switch elements 19. Another end of the certain resistor 18 is connected to another end of the certain switch element 19. The certain switch element 19 is configured to selectively switch between a connected state in which one end of the certain switch element 19 is connected to another end and a disconnected state in which one end of the certain switch element 19 is disconnected from another end thereof. While charging circuit 14 supplies charging current Ic to storage unit 13, when storage voltage Vca across the both ends of the certain capacitor element 16a reaches predetermined upper limit voltage Vm2 that is higher than the predetermined upper limit voltage Vm1, controller 15 causes charging circuit 14 to stops supplying charging current Ic to storage unit 13, and causes the certain switch element 19 to be in the connected state. After that, when storage voltage Vca of the certain capacitor element 16a becomes lower than predetermined upper limit voltage Vm1, controller 15 switches the certain switch element 19 from the connected state to the disconnected state, and causes charging circuit 14 to start supplying charging current Ic to storage unit 13.

Figure 5:
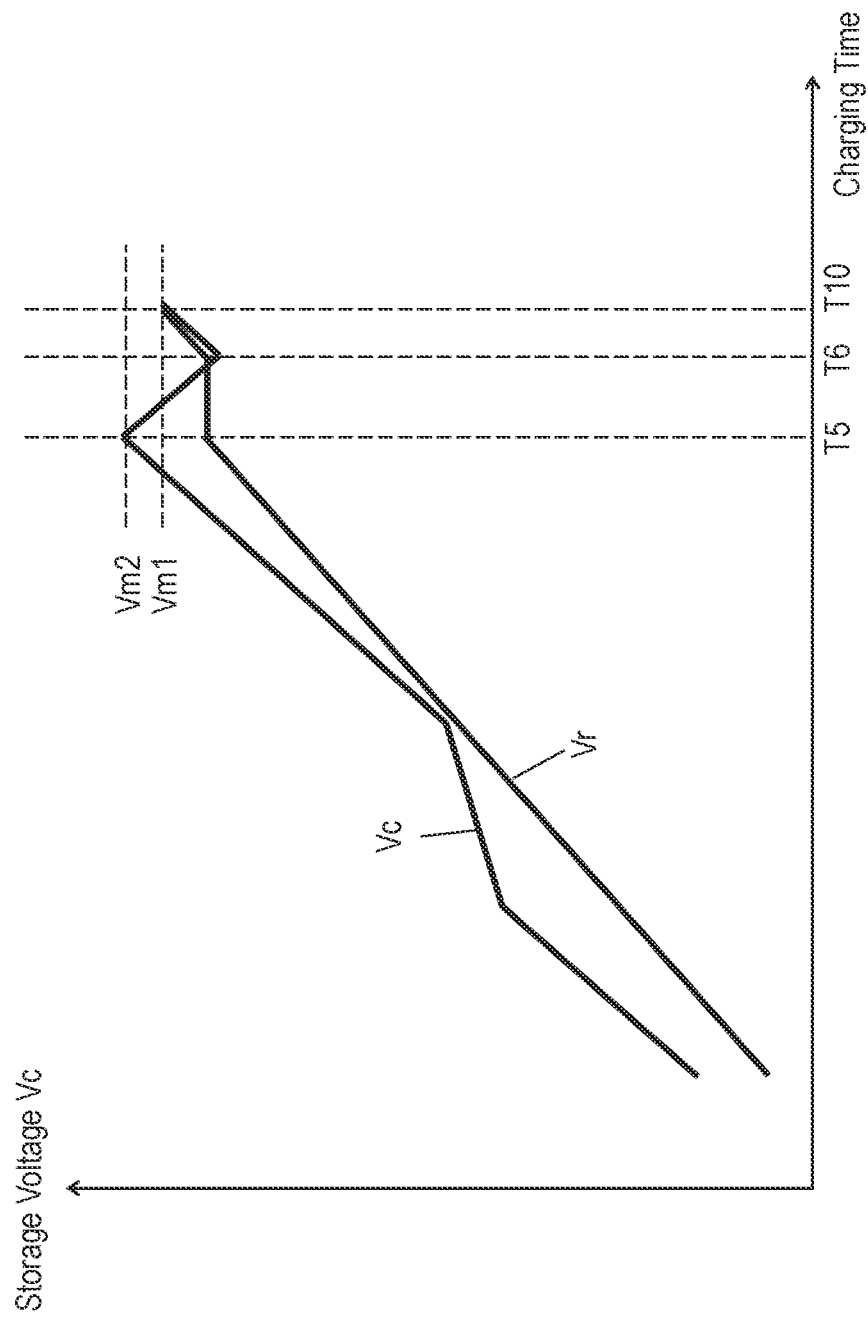
FIG. 5 shows a storage voltage and a charging time of the power storage system in accordance with the embodiment.

As the third step, another operation of power storage system 11 when storage element 12 mostly reaches the rated voltage will be described below. FIG. 5 shows storage voltage Vc and charging time in this operation of power storage system 11. In FIG. 5, items identical to those of FIGS. 3 and 4 are denoted by the same reference numerals. The rated voltage of capacitor element 16 of storage element 12 may be a fully charged voltage. In the third step, upper limit voltage Vm1 and upper limit voltage Vm2 are used as reference for the operation. Upper limit voltage Vm2 is higher than upper limit voltage Vm1. Upper limit voltage Vm2 is substantially equal to or lower than the rated voltage.

When reference voltage Vr becomes higher than upper limit voltage Vm1, controller 15 causes charging circuit 14 to stop supplying charging current Ic to storage unit 13. Alternatively, when reference voltage Vr reaches upper limit voltage Vm1, controller 15 causes charging circuit 14 to stop supplying charging current Ic to storage unit 13. Thus, capacitor elements 16 of all storage elements 12 are charged while storage voltages Vc of capacitor elements 16 of all storage elements 12 are lower than the rated voltage and are approximating the rated voltage.

In FIG. 5, reference voltage Vr reaches upper limit voltage Vm1 at timing T10. In the case that reference voltage Vr is previously set based on the typical characteristics of capacitor element 16 or set to an average value Vav of storage voltages Vc of capacitor elements 16 of all storage elements 12, most of all storage elements 12 are charged with storage voltage Vc approximating to upper limit voltage Vm1.

Particularly in the case that reference voltage Vr is the lowest value among storage voltages Vc of the capacitor elements 16 of plural storage elements 12, all storage elements 12 are charged to have upper limit voltage Vm1. Consequently, the charging can be performed to a charging state close to the characteristic limit of the capacitor element while the deterioration of the characteristics of the capacitor element 16 is suppressed.

In the third step in which reference voltage Vr reaches upper limit voltage Vm1, for example, power storage system 11 operates in the following process.

Controller 15 compares reference voltage Vr with upper limit voltage Vm1 while charging circuit 14 supplies charging current Ic to storage unit 13. Controller 15 compares storage voltage Vc of storage element 12 with upper limit voltage Vm2 while charging circuit 14 supplies charging current Ic to storage unit 13. In other words, controller 15 performs the determination necessary for the third step simultaneously to performing the second step.

When controller 15 detects, at timing T5, that storage voltage Vc of capacitor element 16 of any one storage element 12 out of storage elements 12 becomes higher than upper limit voltage Vm2, controller 15 causes charging circuit 14 to stop supplying charging current Ic to storage unit 13. Alternatively, when controller 15 detects that storage voltage Vc of capacitor element 16 of any one storage element 12 out of storage elements 12 reaches upper limit voltage Vm2, controller 15 causes charging circuit 14 to stop supplying charging current Ic to storage unit 13. In the case that storage voltage Vc is a storage voltage Vca of storage element 12a shown in FIG. 3, an operations when storage voltage Vca of storage element 12a is higher than upper limit voltage Vm2 or reaches upper limit voltage Vm2 at timing T5 will be described below.

When controller 15 detects, at timing T5, that storage voltage Vca of capacitor element 16a of storage element 12a out of storage elements 12 reaches upper limit voltage Vm2, controller 15 causes charging circuit 14 to stop supplying charging current Ic to storage unit 13. Furthermore, controller 15 switches switch element 19 of storage element 12a from the disconnected state to the connected state, and maintains switch elements 19 of the other storage elements 12b-12d at the disconnected state. At timing T5, as mentioned above, charging circuit 14 stops suppling of electric power to storage unit 13. Therefore, when switch element 19 of storage element 12a becomes in the connected state at timing T5, capacitor element 16a is discharged to resistor 18, storage voltage Vc of storage element 12a decreases regardless of the resistance of resistor 18, but decreases at a lowering rate corresponding to the resistance of resistor 18.

After that, when storage voltage Vca of storage element 12a decreases and becomes lower than reference voltage Vr at timing T6, controller 15 switches switch element 19 of storage element 12a from the connected state to the disconnected state. Alternatively, when storage voltage Vca of storage element 12a decreases and reaches reference voltage Vr at timing T6, controller 15 switches switch element 19 from the connected state to the disconnected state, and maintains switch elements 19 of storage elements 12b-12d at the disconnected state. During period PT56 from timing T5 to timing T6, capacitor elements 16b-16d of storage elements 12b-12d other than storage element 12a out of storage elements 12 are neither charged nor discharged. Therefore, during period PT56, reference voltage Vr is almost constant without changing. In the case that reference voltage Vr is previously set based on the typical characteristics of capacitor element 16 or to the lowest value among the storage voltages Vc of plural storage elements 12, reference voltage Vr dose not substantially change during period PT56.

In addition, at timing T6, controller 15 switches switch element 19 of storage element 12a from the connected state to the disconnected state and maintains switch elements 19 of the other storage elements 12b-12d at the disconnected state, and controller 15 causes charging circuit 14 to supply charging current Ic to storage unit 13. Thus, reference voltage Vr and storage voltages Vca-Vcd (Vc) of capacitor elements 16a-16d (16) of all storage elements 12a-12d (12) including storage element 12a start to increase again. Then, when storage voltage Vc of storage element 12a or reference voltage Vr increases and reaches upper limit voltage Vm1 at timing T10, controller 15 causes charging circuit 14 to stop supplying of charging current Ic to storage unit 13, thereby completing the charging of storage unit 13.

Timing T10 at which controller 15 causes charging circuit 14 to stop supplying charging current Ic to storage unit 13 is preferably a timing when reference voltage Vr reaches upper limit voltage Vm1. In general, reference voltage Vr is lower than storage voltage Vc of storage element 12a. Therefore, at the timing when reference voltage Vr reaches upper limit voltage Vm1, storage voltage Vc of storage element 12a has already reached upper limit voltage Vm1.

Alternatively, when both storage voltage Vc of storage element 12a and reference voltage Vr increase and reach upper limit voltage Vm1 at timing T10, controller 15 causes charging circuit 14 to stop supplying charging current Ic to storage unit 13, thus completing the charging of storage unit 13.

The above operation prevents capacitor element 16 of storage element 12 from being charged to have a voltage equal to or higher than the rated voltage or a full storage voltage, allows storage voltages Vc of capacitor elements 16 of all storage elements 12 to approximate to one another and become a value close to the fully charged voltage, and charges capacitor element 16. Thus, procession of deterioration of capacitor element 16 is suppressed.

While charging circuit 14 supplies charging current Ic to storage unit 13, if storage voltage Vca across the both ends of the certain capacitor element 16a reaches predetermined upper limit voltage Vm2 that is higher than predetermined upper limit voltage Vm1, controller 15 causes charging circuit 14 to stop supplying charging current Ic to storage unit 13 and causes the certain switch element 19 to be into the connected state. After that, when storage voltage Vca of the certain capacitor element 16a becomes lower than reference voltage Vr, controller 15 switches the certain switch element 19 from the connected state to the disconnected state, and causes charging circuit 14 to start supplying charging current Ic to storage unit 13.

Figure 6:
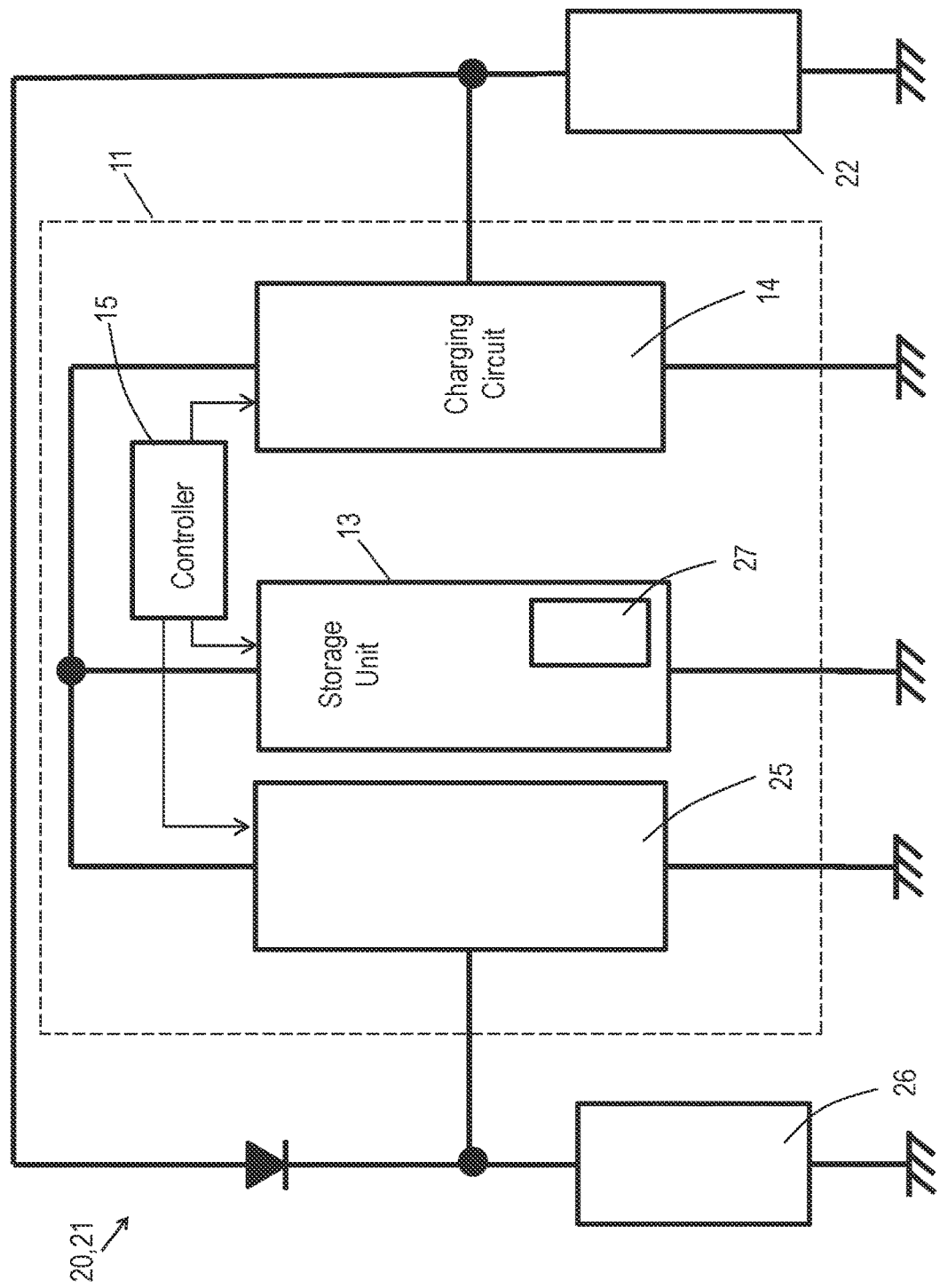
FIG. 6 is a circuit block diagram of another vehicle including the power storage system in accordance with the embodiment installed thereto.

FIG. 6 is a circuit block diagram of vehicle 20 having power storage system 11 in accordance with the embodiment installed thereto. Power storage system 11 further includes discharging circuit 25 configured to discharge electric power stored in storage unit 13 to vehicle load 26 via discharging circuit 25. Power storage system 11 temporarily supplies large electric power having a large current density via discharging circuit 25 to vehicle load 26 in, e.g. emergency when vehicle storage battery 22 is damaged.

Storage unit 13 also supplies electric power to controller 15 to power controller 15. Then, when discharging circuit 25 supplies electric power to vehicle load 26, for example, in emergency regardless of electric power remaining in storage element 12 or storage unit 13, power storage system 11 performs an operation of exhausting almost all the electric power. Particularly in order to allow discharging circuit 25 to operate as a boost converter, a predetermined voltage or more of a residual voltage of needs to remain in storage unit 13. Unless there is not the predetermined voltage or more residual voltage, even if controller 15 is operative, a voltage boost operation cannot be performed.

Consequently, in order that power storage system 11 can operate immediately when vehicle 20 is restarted from a state in which the driving of vehicle 20 is completely stopped, voltage maintaining circuit 27 operates and discharging is performed while a predetermined power remains in storage unit 13 at the time when or after vehicle 20 stops. Electric power or voltage to remain in storage unit 13 is an initial voltage or a value that is not more than the initial voltage, in which capacitor element 16 of storage element 12 hardly deteriorate, as described above. However, even if the remaining voltage is a value of the initial voltage or not more than the initial voltage, it is not easy to completely avoid deterioration of capacitor element 16 because the initial voltage remains for a long period of time.

In power storage system 11, storage voltages Vc of all storage elements 12 are maintained even if they are approximate values and left for a long period of time. Therefore, characteristics deterioration of all capacitor elements 16 due to being left at a low voltage for a long period of time proceeds in an approximate state in all capacitor elements 16. In other words, rapid decrease of charging and discharging performance as power storage system 11, which occurs when deterioration of a part of capacitor elements 16 extraordinarily proceeds, is suppressed. As a result, power storage system 11 can perform an appropriate discharge operation even when discharging circuit 25 supplies, to vehicle load 26, electric power having a large electric density, for example, in emergency.

In the above Examples, all controls are performed by single controller 15, but a function of controller 15 may be dispersed in plural control circuits. The control circuits may be collectively referred to as controller 15.

REFERENCE MARKS IN THE DRAWINGS 11 power storage system
12, 12a to 12d storage unit 13 storage unit
14 charging circuit
15 controller
16, 16a to 16d capacitor element
17 voltage adjustment circuit
18 resistor
19 switch element
20 vehicle
21 vehicle body
22 vehicle storage battery
23 vehicle starter switch
24 signal generator
25 discharging circuit
26 vehicle load
27 voltage maintaining circuit

The invention claimed is:

1. A power storage system comprising:
a storage unit including
a plurality of capacitor elements connected in series to one another, each of the plurality of capacitor elements having both ends,
a plurality of resistors connected to the plurality of capacitor elements, and
a plurality of switch elements connected to the plurality of capacitor elements and the plurality of resistors;
a charging circuit configured to supply a charging current to the storage unit; and
a controller connected to the storage unit, wherein
one of both ends of each capacitor element of the plurality of capacitor elements is connected to one end of a corresponding resistor of the plurality of resistors,
another of the both ends of the each capacitor element is connected to one end of a corresponding switch element of the plurality of switch elements,
another end of the corresponding resistor is connected to another end of the corresponding switch element,
the corresponding switch element is configured to selectively switch between a connected state in which the one end of the corresponding switch element is connected to the another end of the corresponding switch element and a disconnected state in which the one end of the corresponding switch element is disconnected from the another end of the corresponding switch element,
when the charging circuit supplies the charging current to the storage unit, the controller is configured to:
detect storage voltages across respective both ends of the plurality of capacitor elements by detecting a storage voltage across the both ends of the each capacitor element;
providing a single reference voltage configured to change according to the detected storage voltages across the respective both ends of the plurality of capacitor elements, the single reference voltage increasing as the plurality of capacitor elements are charged;
compare the detected storage voltages across the respective both ends of the plurality of capacitor elements with the single reference voltage by comparing the detected storage voltages across the respective both ends of the plurality of capacitor elements with the single reference voltage by comparing the detected storage voltage across the both ends of the each capacitor element with the single reference voltage;
cause the corresponding switch element to be in the disconnected state when a difference between the storage voltage of the each capacitor element and the reference voltage is equal to or larger than a predetermined first voltage difference value; and
cause the corresponding switch element to be in the connected state when the difference between the storage voltage of the each capacitor element and the single reference voltage is larger than the predetermined first voltage difference value, and then, switch the corresponding switch element from the connected state to the disconnected state when the difference between the storage voltage of the each capacitor element and the single reference voltage becomes smaller than a predetermined second voltage difference value,
the controller is configured to cause the charging circuit to stop supplying the charging current to the storage unit when the single reference voltage is higher than a predetermined first upper limit voltage,
one of both ends of a certain capacitor element of the plurality of capacitor elements is connected to one end of a certain resistor of the plurality of resistors,
another of the both ends of the certain capacitor element is connected to one end of a certain switch element of the plurality of switch elements,
another end of the certain resistor is connected to another end of the certain switch element,
the certain switch element is configured to selectively switch between a connected state in which the one end of the certain switch element is connected to the another end of the certain switch element and a disconnected state in which the one end of the certain switch element is disconnected from the another end of the certain switch element, and
the controller is configured to:
when a storage voltage across the both ends of the certain capacitor element reaches a predetermined second upper limit voltage that is higher than the predetermined first upper limit voltage while the charging circuit supplies the charging current to the storage unit, cause the charging circuit to stop supplying the charging current to the storage unit and cause the certain switch element to be in the connected state; and
then, switch the certain switch element from the connected state to the disconnected state, and cause the charging circuit to start supplying the charging current to the storage unit when the storage voltage of the certain capacitor element is lower than the single reference voltage.

2. The power storage system according to claim 1, wherein the predetermined first voltage difference value is larger than the predetermined second voltage difference value.

3. The power storage system according to claim 2, wherein the predetermined first voltage difference value decreases as the single reference voltage increases.

4. The power storage system according to claim 1, wherein the single reference voltage is a lowest value among the storage voltages across between the respective both ends of the plurality of capacitor elements.

5. The power storage system according to claim 1, wherein the single reference voltage is an average value of the storage voltages across the respective both ends of the plurality of capacitor elements.

6. A power storage system comprising:
a storage unit including a plurality of capacitor elements connected in series to one another, each of the plurality of capacitor elements having both ends,
a plurality of resistors connected to the plurality of capacitor elements, and
a plurality of switch elements connected to the plurality of capacitor elements and the plurality of resistors;
a charging circuit configured to supply a charging current to the storage unit; and
a controller connected to the storage unit, wherein
one of both ends of each capacitor element of the plurality of capacitor elements is connected to one end of a corresponding resistor of the plurality of resistors,
another of the both ends of the each capacitor element is connected to one end of a corresponding switch element of the plurality of switch elements,
another end of the corresponding resistor is connected to another end of the corresponding switch element,
the corresponding switch element is configured to selectively switch between a connected state in which the one end of the corresponding switch element is connected to the another end of the corresponding switch element and a disconnected state in which the one end of the corresponding switch element is disconnected from the another end of the corresponding switch element,
when the charging circuit supplies the charging current to the storage unit, the controller is configured to:
detect storage voltages across respective both ends of the plurality of capacitor elements by detecting a storage voltage across the both ends of the each capacitor element;
providing a single reference voltage configured to change according to the detected storage voltages across the respective both ends of the plurality of capacitor elements, the single reference voltage increasing as the plurality of capacitor elements are charged;
compare the detected storage voltages across the respective both ends of the plurality of capacitor elements with the single reference voltage by comparing the detected storage voltage across the both ends of the each capacitor element with the single reference voltage;
cause the corresponding switch element to be in the disconnected state when a difference between the storage voltage of the each capacitor element and the single reference voltage is equal to or larger than a predetermined first voltage difference value; and
cause the corresponding switch element to be in the connected state when the difference between the storage voltage of the each capacitor element and the single reference voltage is larger than the predetermined first voltage difference value, and then, switch the corresponding switch element from the connected state to the disconnected state when the difference between the storage voltage of the each capacitor element and the single reference voltage becomes smaller than a predetermined second voltage difference value,
the controller is configured to cause the charging circuit to stop supplying the charging current to the storage unit when the single reference voltage is higher than a predetermined first upper limit voltage,
one of both ends of a certain capacitor element of the plurality of capacitor elements is connected to one end of a certain resistor of the plurality of resistors,
another of the both ends of the certain capacitor element is connected to one end of a certain switch element of the plurality of switch elements,
another end of the certain resistor is connected to another end of the certain switch element,
the certain switch element is configured to selectively switch between a connected state in which the one end of the certain switch element is connected to the another end in the certain switch element and a disconnected state in which the one end of the certain switch element is disconnected from the another end in the certain switch element, and
the controller is configured to:
when a storage voltage across the both ends of the certain capacitor element reaches a predetermined second upper limit voltage that is higher than the predetermined first upper limit voltage while the charging circuit supplies the charging current to the storage unit, cause the charging circuit to stop supplying the charging current to the storage unit, and cause the certain switch element to be in the connected state; and
then, switch the certain switch element from the connected state to the disconnected state, and cause the charging circuit to start supplying the charging current to the storage unit when the storage voltage of the certain capacitor element is lower than the predetermined first upper limit voltage.

7. The power storage system according to claim 6, wherein the predetermined first voltage difference value is larger than the predetermined second voltage difference value.

8. The power storage system according to claim 7, wherein the predetermined first voltage difference value decreases as the single reference voltage increases.

9. The power storage system according to claim 6, wherein the single reference voltage is a lowest value among the storage voltages across between the respective both ends of the plurality of capacitor elements.

10. The power storage system according to claim 6, wherein the single reference voltage is an average value of the storage voltages across the respective both ends of the plurality of capacitor elements.

* * * * *